US006178209B1

United States Patent
Hulyalkar et al.

(10) Patent No.: US 6,178,209 B1
(45) Date of Patent: Jan. 23, 2001

(54) METHOD OF ESTIMATING TRELLIS ENCODED SYMBOLS UTILIZING SIMPLIFIED TRELLIS DECODING

(75) Inventors: Samir N. Hulyalkar, Bensalem; Thomas J. Endres, Perkasie; Troy A. Schaffer, Langhorne; Christopher H. Strolle, Glenside, all of PA (US)

(73) Assignee: Sarnoff Digital Communications, Newtown, PA (US)

( * ) Notice: Under 35 U.S.C. 154(b), the term of this patent shall be extended for 0 days.

(21) Appl. No.: 09/099,730

(22) Filed: Jun. 19, 1998

(51) Int. Cl.[7] .............................. H03D 1/00; H04L 27/06
(52) U.S. Cl. ............................ 375/341; 714/796
(58) Field of Search ................................ 375/24 J, 262, 375/265, 341; 714/786, 792, 794, 795, 796

(56) References Cited

U.S. PATENT DOCUMENTS

| 5,056,117 | 10/1991 | Gitlin et al. . | |
|---|---|---|---|
| 5,548,648 | * 8/1996 | Wang et al. . | |
| 5,588,025 | 12/1996 | Strolle et al. . | |
| 5,757,855 | 5/1998 | Strolle et al. . | |
| 5,907,586 | * 5/1999 | Katsuragawa et al. | 375/341 |
| 5,923,711 | * 1/1999 | Willming | 375/287 |
| 5,946,361 | * 8/1999 | Araki et al. | 375/341 |

OTHER PUBLICATIONS

J.G. Proakis, *Digital Communication*.
V. Eyuboglu and S. Qureshi, "Reduced–State Sequence Estimation for Coded Modulation on Intersymbol Interference Channels" *IEEE Journal on Selected Areas of Communications*, Aug. 1989.
A. Duel–Hallen and C. Heegard, Delayed Decision–Feedback Equalization, *IEEE Transactions on Communications*, May 1989.
G. Ungerboeck, "Trellis Coded Modulation with redundant Signal Sets Part I and II", *IEEE Communications*, Feb. 1987.
G. Ungerboeck, "Channel Coding With Multilevel/Phase Signals", *IEEE Transactions of Information Theory*, Jan. 1982.
A. Viterbi et al., *Principles of Digital Communications and Coding,*.
Advanced Television Systems Committee, "ATSC Digital Television Standard" Doc. A/53, Apr. 12, 1995.
Advanced Television Systems Committee,—Guide To The Use Of The ATSC Digital.Television Doc A/54, Apr. 12, 1995.

* cited by examiner

*Primary Examiner*—Chi H. Pham
*Assistant Examiner*—Jean Corrielus
(74) *Attorney, Agent, or Firm*—Ratner & Presia (57) ABSTRACT

A slicer for a decision feedback error equalizer system which processes trellis encoded data using the ATSC trellis code is implemented in two parts. A first part includes a single-stage trellis decoder which estimates the value of a single bit of the symbol. The second part includes two trellis decoders each of which estimates the values of respective subsets of the symbols in the alphabet given that the single bit is zero or one. A multiplexer is responsive to the single stage trellis decoder to direct the received digital samples to one of the two trellis decoders in the second part of the slicer. An alternative slicer includes a first part which estimates two bits of the output symbols and selects from among four decoders in the second part in order to fully decode the symbols. The smart slicer can be generalized for any set-partitioned code with or without a feedback convolutional code.

5 Claims, 8 Drawing Sheets

METHOD OF ESTIMATING TRELLIS ENCODED SYMBOLS UTILIZING SIMPLIFIED TRELLIS DECODING

BACKGROUND OF THE INVENTION

Equalizers are typically used in coded digital communications systems to compensate for multipath/linear filtering effects caused by the transmission channel. These effects are commonly referred to as channel impairments and include signal distortion which may occur in the transmitter, in the receiver or in the channel through which the signal is transmitted. The equalizer is an adaptive filter, often implemented as a finite impulse response (FIR) filter, an infinite impulse response (IIR) filter or a combination of FIR and IIR filters. Each filter has a plurality of coefficients which are adapted to minimize an error criterion. This error criterion may be, for example, the mean-square error between a transmitted training signal and the received training signal. A typical equalizer maintains a copy of the transmitted training signal to compare with the received training signal. It is generally believed that a decision-feedback equalizer (DFE) has better asymptotic performance than a linear equalizer as described in a text book by J. G. Proakis, entitled *Digital Communications*.

Figure 1:
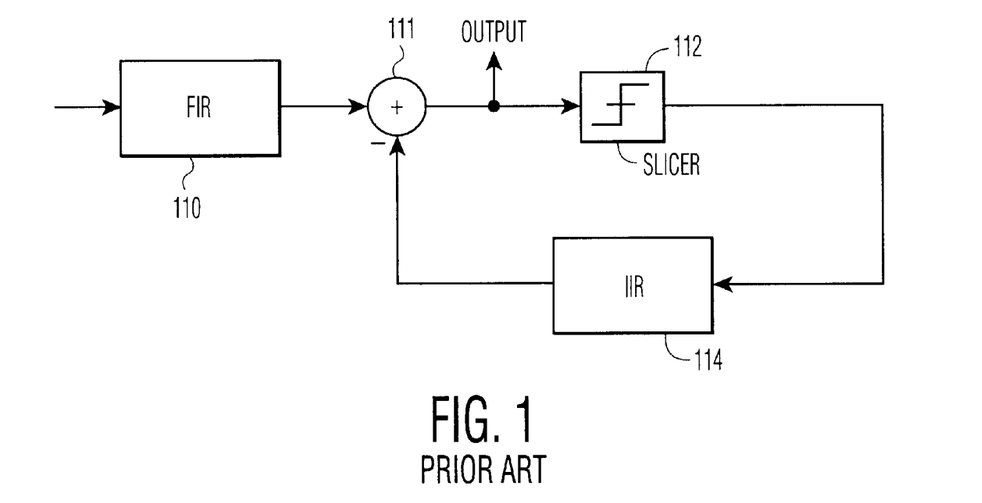
FIG. 1 (prior art) is a block diagram of a decision feedback equalizer.

A typical DFE is shown in FIG. 1. The received signal is applied to an FIR filter and the output signal produced by the FIR filter is applied to an IIR filter. The IIR filter includes a subtracter 111, a slicer 112 and an IIR filter section 114. The subtracter 111 subtracts the filtered signal provided by the IIR filter section 114 from the output signal of the FIR filter 110. The slicer 112 quantizes the signal provided by the subtracter 111 to produce an approximation of the signal that was transmitted. The IIR filter section, which may, for example, be an FIR filter in a feedback loop, processes the quantized signal to produce the signal which is subtracted by the subtracter 111. For an uncoded modulation scheme, the DFE uses the slicer to get decisions for the feedback portion. The output signal of the slicer is compared to the training signal to determine in what way the coefficients of the FIR and IIR filter sections should be updated to minimize any differences.

For a coded modulation scheme, it may be desirable to replace the slicer with a decoder, which may include, for example, a trellis decoder, a deinterleaver, and a Reed Solomon (RS) decoder. Such a decoder, however, results in many symbol delays before a decision can be made on the symbol that was transmitted. These delays can be prohibitive for the DFE, since it relies on canceling the inter-symbol-interference of the previous symbols on the current symbol by using previously available decisions. Hence, the state of the art has typically not used a complete decoder, but a range of simplified decoders including the simple slicer 112, which does not perform any decoding. A typical problem with using only a slicer in a DFE is a loss in performance due to incorrect decisions. Because an incorrect decision used in the DFE to remove inter-symbol interference (ISI) can cause further errors, this performance loss is known as 'error propagation'.

More complex decoding techniques may also be used, for example, Reduced-State Sequence Estimation (RSSE) and parallel decision feedback decoding (PDFD). These techniques are described in an article by V. Eyuboglu and S. Qureshi, entitled "Reduced-State Sequence Estimation for Coded Modulation on Intersymbol Interference Channels" *IEEE Journal on Selected Areas of Communications*, August 1989. Furthermore, U.S. Pat. No. 5,056,117 entitled DECISION-FEEDBACK EQUALIZATION WITH TRELLIS CODING to R. Gitlin, describes a method by which multiple possible decisions are fed back and the best among them is chosen using a given criteria. Other techniques are described in an article by A. Duel-Hallen and C. Heegard, entitled "Delayed Decision-Feedback Equalization", *IEEE Transactions on Communications* May 1989. All of the above cited references are incorporated herein by reference for their teachings on equalization and decoding techniques.

Generally the common idea among these decoders is to use multiple possible decisions or to use more complicated trellis decoders which include a channel state estimate. The implementation complexity of these approaches, however, is significant and may undesirably add to the cost of the decoder.

SUMMARY OF THE INVENTION

The present invention is embodied in a quantizer which may be used to recover N-bit symbols from successive channel impaired input samples representing a trellis encoded signal. The quantizer includes a partial trellis decoder which generates an estimate of a subset of the N bits of each symbol and, based on the estimate, selects a decision device for a reduced constellation to generate an estimate of the N bits.

According to one aspect of the invention, the trellis encoder which generated the input samples is based on a set-partitioned code and the partial trellis decoder computes path metrics for the current symbol based on path metrics of the previous symbol. The best path metric of the current symbol is used to select the reduced-constellation decision device.

According to another aspect of the invention, the trellis encoder which generated the input samples is based on a set-partitioned code with feedback convolutional encoding and the partial trellis decoder computes path metrics for the current symbol based on path metrics of the previous symbol. The best path metric of the previous symbol is used to select the reduced-constellation decision device.

According to yet another aspect of the invention, the trellis encoder which generated the input samples is based on a set-partitioned code and the partial trellis decoder computes path metrics for the current symbol based on path metrics of the previous symbol. The best path metric from among the path metrics of the current symbol, corresponding to a subset of states for the previous symbol, is used to select the reduced-constellation decision device.

DETAILED DESCRIPTION

To determine how a code may be effectively decoded, it is desirable to study the codes currently used in the state of the art. Generally the state of the art uses "Set-Partition Codes" or "Coset Codes", and will be referred to as set-partition codes in the following. These codes use a feedback convolution code and a subset mapping technique, as described in an article by G. Ungerboeck, entitled, "Trellis-Coded Modulation with Redundant Signal Sets Part I and II", *IEEE Communications*, February 1987, which is incorporated herein by reference for its teaching on set partition codes.

Figure 2:
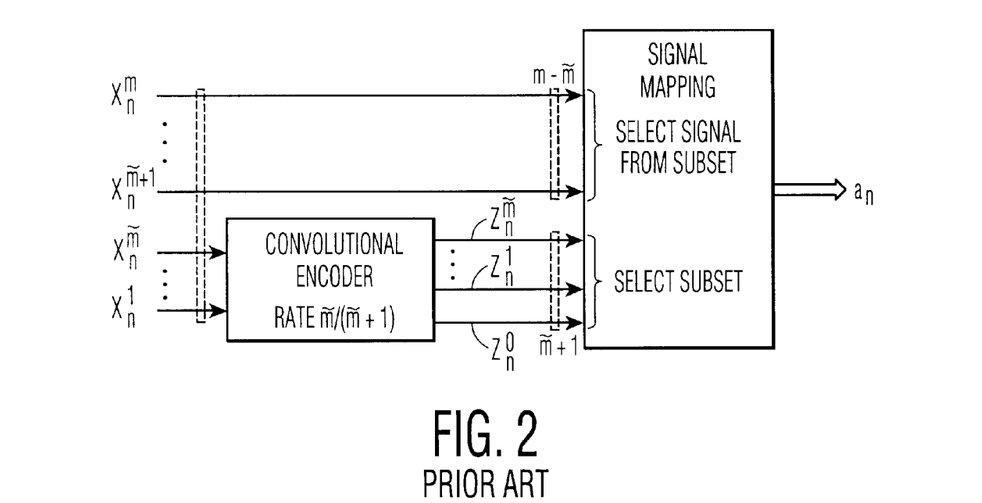
FIG. 2 (prior art) is a block diagram of an encoder modulator for trellis coded modulation.
Figure 3:
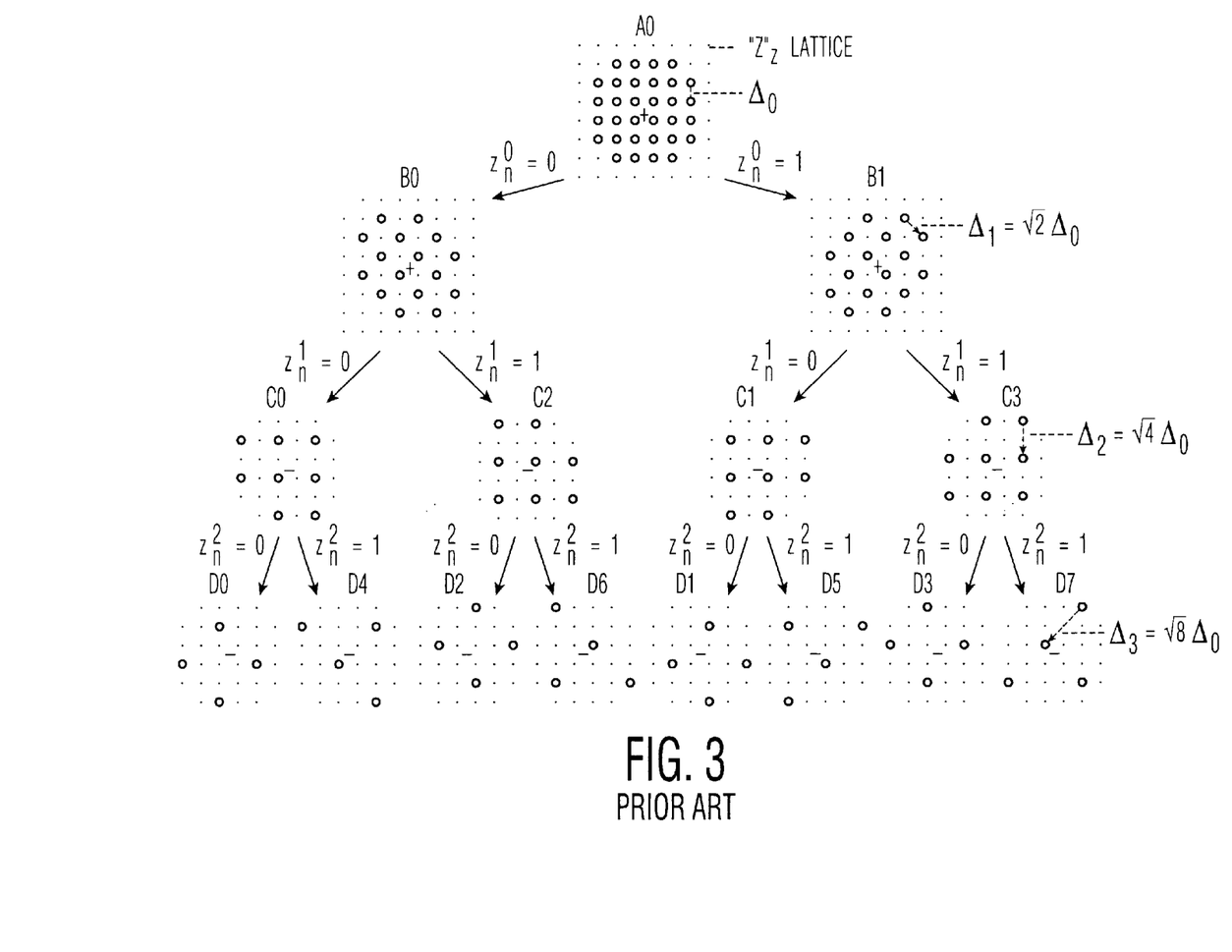
FIG. 3 (prior art) is a code constellation decomposition diagram which is useful for describing the operation of the encoded modulator shown in FIG. 2.

An example of a set partition encoder is shown in FIG. 2, which is copied from the above-referenced article by Ungerboeck. The coded bits select subsets of a specific constellation as shown, for example, in FIG. 3. The uncoded bits then select individual points within the constellation. Note that the distance between signal points increase by a factor of the square root of 2 as shown in FIG. 2. Hence, if the coded bits can somehow be 'predicted' then an appropriate slicer can be selected, and this slicer will provide better decisions than a simple slicer. Such a slicer is termed as the 'smart slicer' in the following and comprises the subject of the invention.

Figure 4:
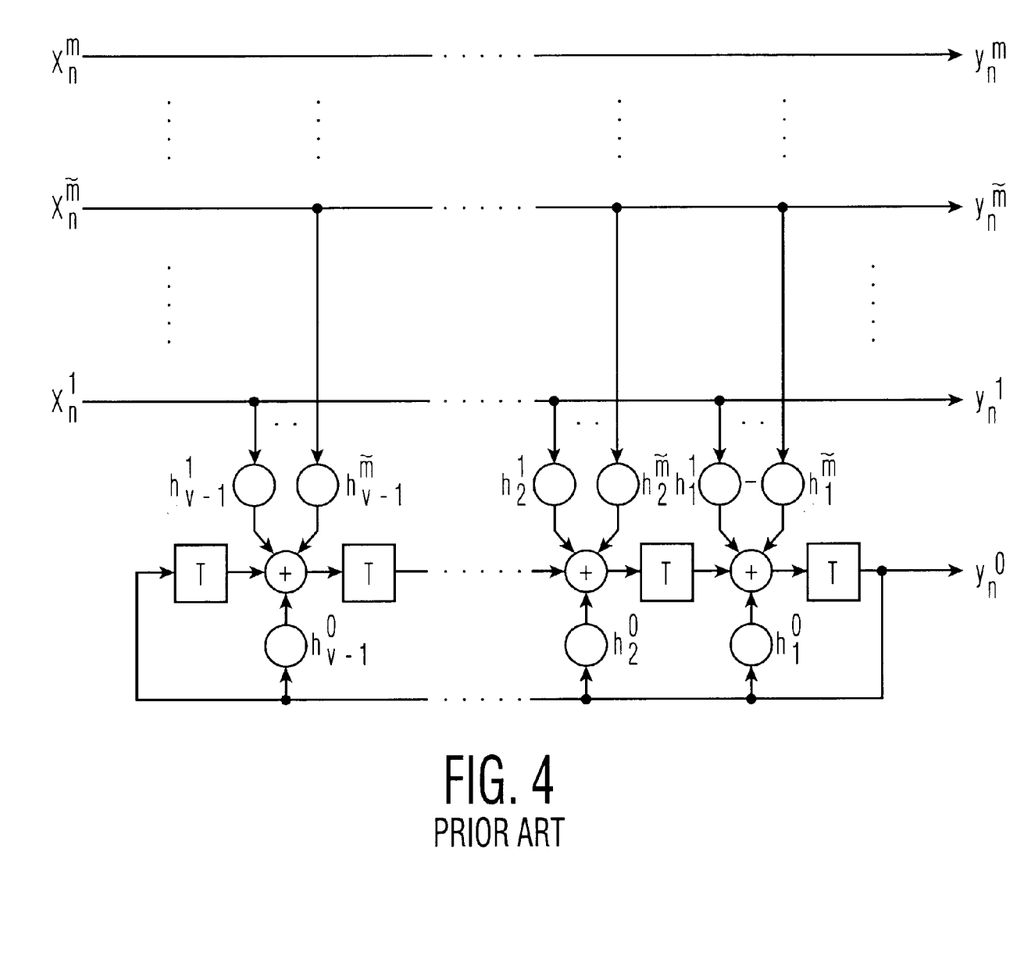
FIG. 4 (prior art) is a block diagram of a generalized convolutional encoder structure with feedback.
Figure 5A:
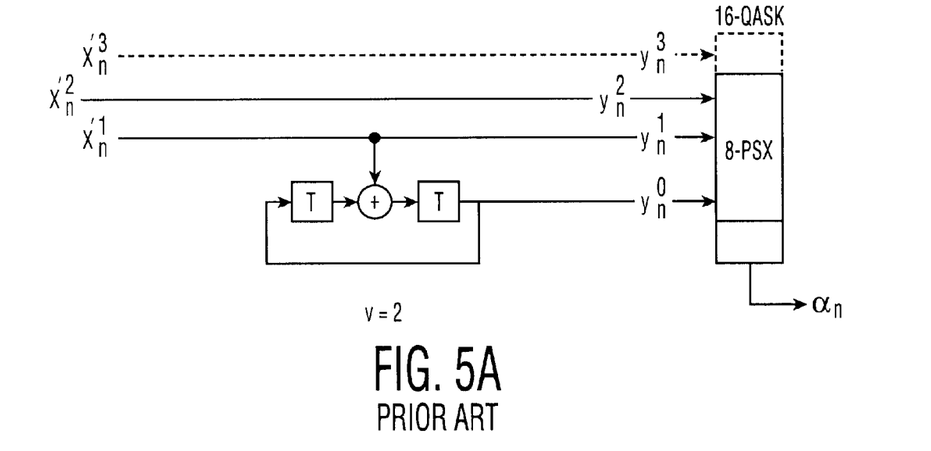
FIGS. 5A, 5B and 5C (all prior art) are block diagrams of exemplary specific convolutional encoders with feedback.
Figure 5B:
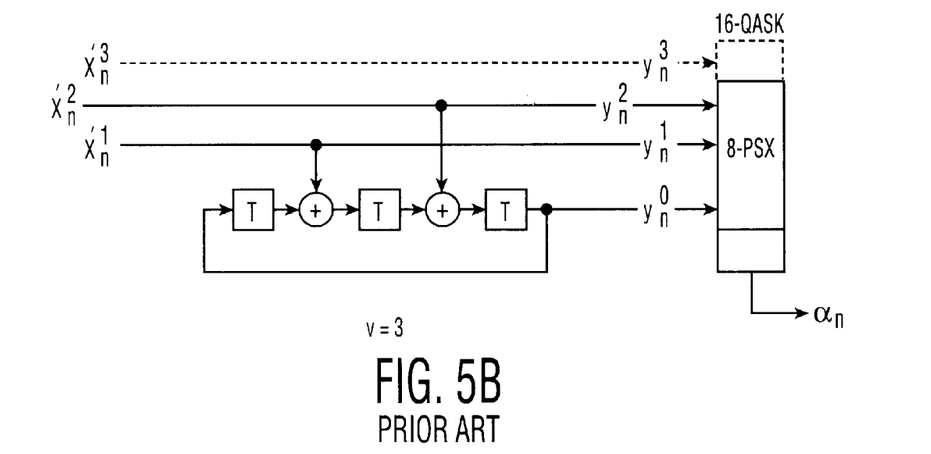
Figure 5C:
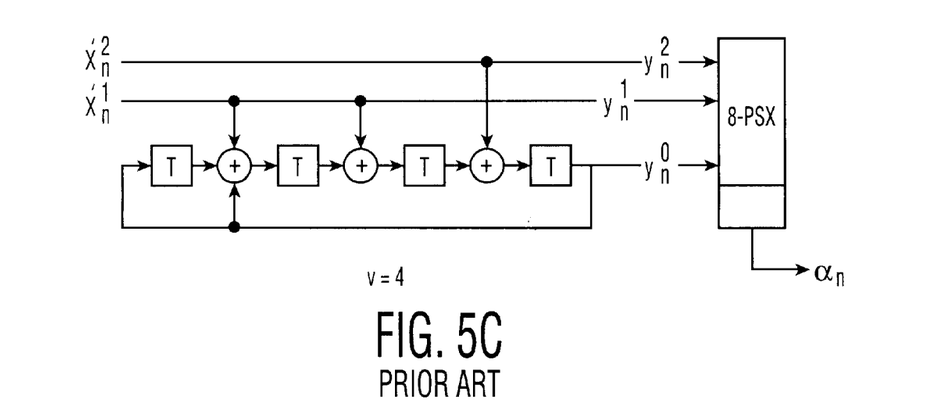

The method of predicting the coded bits relies on a second property of the set-partition codes, which is the use of a feedback convolutional encoders with a certain characteristic to generate the codes. The class of these feedback encoders include those which are used to maximize the minimum Euclidean distance as described in an article by G. Ungerboeck, entitled, "Channel Coding With Multilevel/Phase Signals", *IEEE Transactions of Information Theory*, January 1982, which is incorporated herein by reference for its teaching on set partition codes. This class of feedback encoders have the property that some coded bits (at least the last coded bit shown as $Z0(n)$) are determined uniquely one interval before the bits are used. This is illustrated by FIGS. 4 and 5. Note that in FIGS. 5A through 5C, the 'coded bit' $y0(n)$ is determined one symbol interval before the current symbol. Hence, the previous state estimate can be used to determine $y0(n+1)$. Clearly, this observation can be generalized to the case of many coded bits being estimated.

Many methods can now be used to generate an estimate of the coded bits. Generally, a trellis decoder uses a Viterbi Algorithm (Va.) with path length<=2, as described in a text book by A. Viterbi et al. entitled *Principles of Digital Communications and Coding* which is incorporated herein by reference for its teaching on trellis encoding and decoding.

The present invention is embodied in a 'smart slicer' which provides a better estimate for the feedback portion of the DFE than a slicer that uses no coding information. In addition the complexity of the trellis decoder and the decision-feedback portion is not increased. Furthermore, no delay is incurred by use of the smart slicer, hence, this approach provides a better estimate of the symbol with no delay.

The smart slicer may be used with a class of codes generally referred to as "Set Partition Codes" or "Coset Codes." The smart slicer relies on two properties of these codes: the use of a set-partitioned signal mapper and the use of a feedback convolutional code. The smart slicer generates an estimate of some of the coded bits and then uses this estimate to select a slicer from among a set of slicers. Several exemplary methods are described to generate an estimate of the coded bits.

The most complex of these methods is to use a complete trellis decoder with path length=2. In this case, the trellis decoder computations are desirably finished to generate the estimate of the coded bits, then the coded bits are used to generate the output signal of the slicer. This output signal is then used in the feedback filter of the DFE. These steps imply that both the output signal of the feedback filter and the trellis decoder computation are completed within one symbol interval.

The simplest of the described methods for generating an estimate of the coded bits is to use a complete trellis decoder with path length=1. In this case, the computations performed by the feedback filter and the trellis decoder are done in parallel, i.e., the estimate of the coded bits is done before the next signal sample is available. Hence the slicer selection for the current input is implemented before the current input is available. This implementation is very simple.

Another method of generating an estimate of the coded bits is to use only a subset of states for the selection of the coded bits, but to keep track of the full trellis decoder after the estimation of the coded bits is complete. Using this method, the computations performed during a symbol interval include first computing an estimate of coded bits, then in parallel using the output signal of the slicer to compute the feedback portion of the DFE, thus completing the trellis decoder computation. This method can use ideas from the M-algorithms, described in the above-referenced book by Viterbi et al., and selects the best M states to make the estimation of the coded bits.

Finally, a simplified mechanism of generating an estimate of the coded bit for the VSB system is described, which method is specified relative to the ATSC trellis encoder.

For the purpose of describing the invention, the VSB trellis code as used in the ATSC system will be used as an example. It is contemplated, however, that the subject invention has general application to other systems which use trellis codes or other Viterbi-type encoding techniques.

Figure 6:
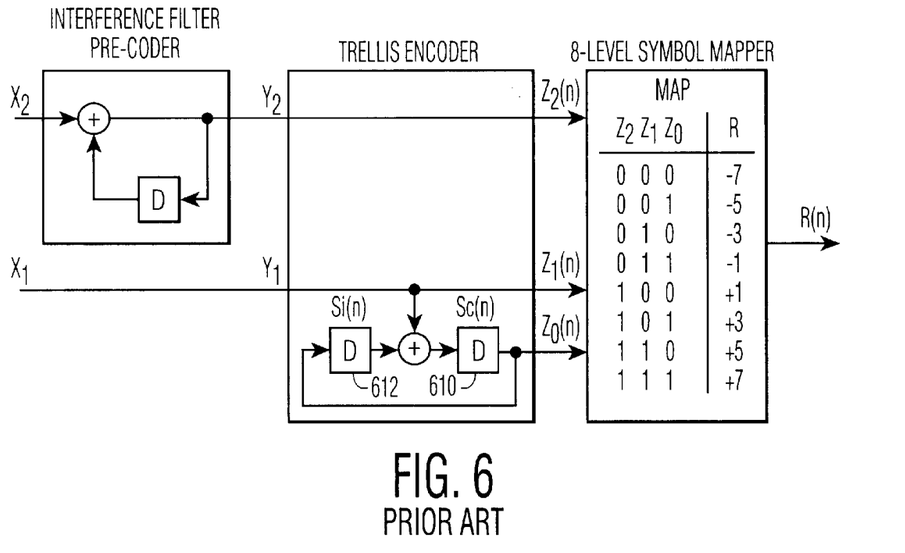
FIG. 6 (prior art) is a block diagram of an exemplary trellis encoder as specified for digital television signals in the standard specified by the Advanced Television System Committee (ATSC).

The ATSC trellis encoder shown in FIG. 6 defines states $S_1(n)$ and $S_0(n)$ as the current input samples to the delay elements. Note that, by operation of the delay elements 610 and 612, the trellis encoder shown in FIG. 6 is constrained by equations (1) and (2).

$$Z_0(n) = S_0(n-1) \tag{1}$$

$$Z_0(n) = S_1(n) \tag{2}$$

The trellis code output ($R(n)$) is completely specified by the previous state ($S_1(n-1)$, $S_0(n-1)$) and the current inputs $Z_1(n)$ and $Z_2(n)$. Specifically, the bit $Z_0(n)$ can be specified by the previous states ($S_1(n-1)$, $S_0(n-1)$) and the current input $Z_1(n)$.

Figure 7A:
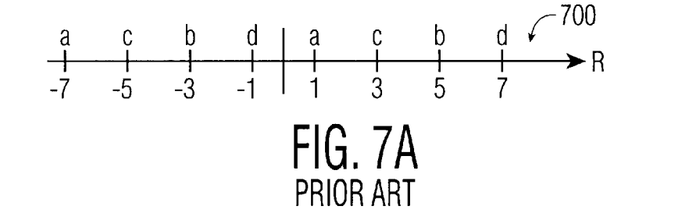
FIG. 7A (prior art) is a constellation diagram for the trellis encoder shown in FIG. 6.
Figure 7B:
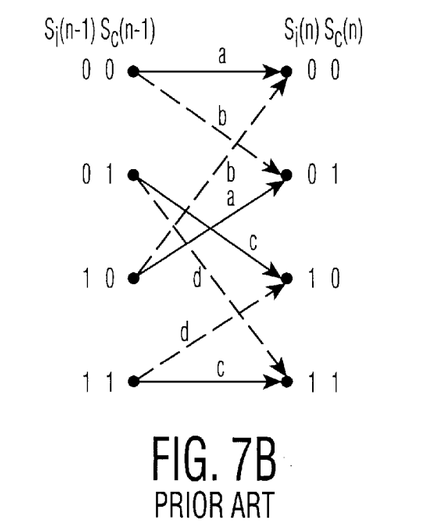
FIG. 7B (prior art) is a trellis diagram for the trellis encoder shown in FIG. 6.

Such a relationship may be described using the constellation 700 shown in FIG. 7A and the corresponding trellis diagram shown in FIG. 7B. In FIG. 7B, The branches specify a transition from a specific state ($S_1(n-1)$, $S_0(n-1)$) of the trellis encoder to another state ($S_1(n)$, $S_0(n)$) given the input bit $Z_1(n)$. A broken line branch represents a transition when $Z_1(n)=0$, and a solid line represents a transition when $Z_1(n)=1$. Also listed on top of the transitions are outputs ($Z_1(n)$, $Z_0(n)$), which are one of the four subsets 'a', 'b', 'c', or 'd' that are defined as follows.

'a':{−7,1} (corresponds to $Z_1(n)=0$ and $Z_0(n)=0$)
'b':{−3,5} (corresponds to $Z_1(n)=1$ and $Z_0(n)=0$)
'c':{−5,3} (corresponds to $Z_1(n)=0$ and $Z_0(n)=1$)
'd':{−1,7} (corresponds to $Z_1(n)=1$ and $Z_0(n)=1$)

Thus the trellis diagram of FIG. 7B completely specifies the next state as well as the next output given the new input to the state diagram. Note that the bit $Z_2(n)$ selects one of two signal points from subsets 'a', 'b', 'c', or 'd'.

Figure 8:
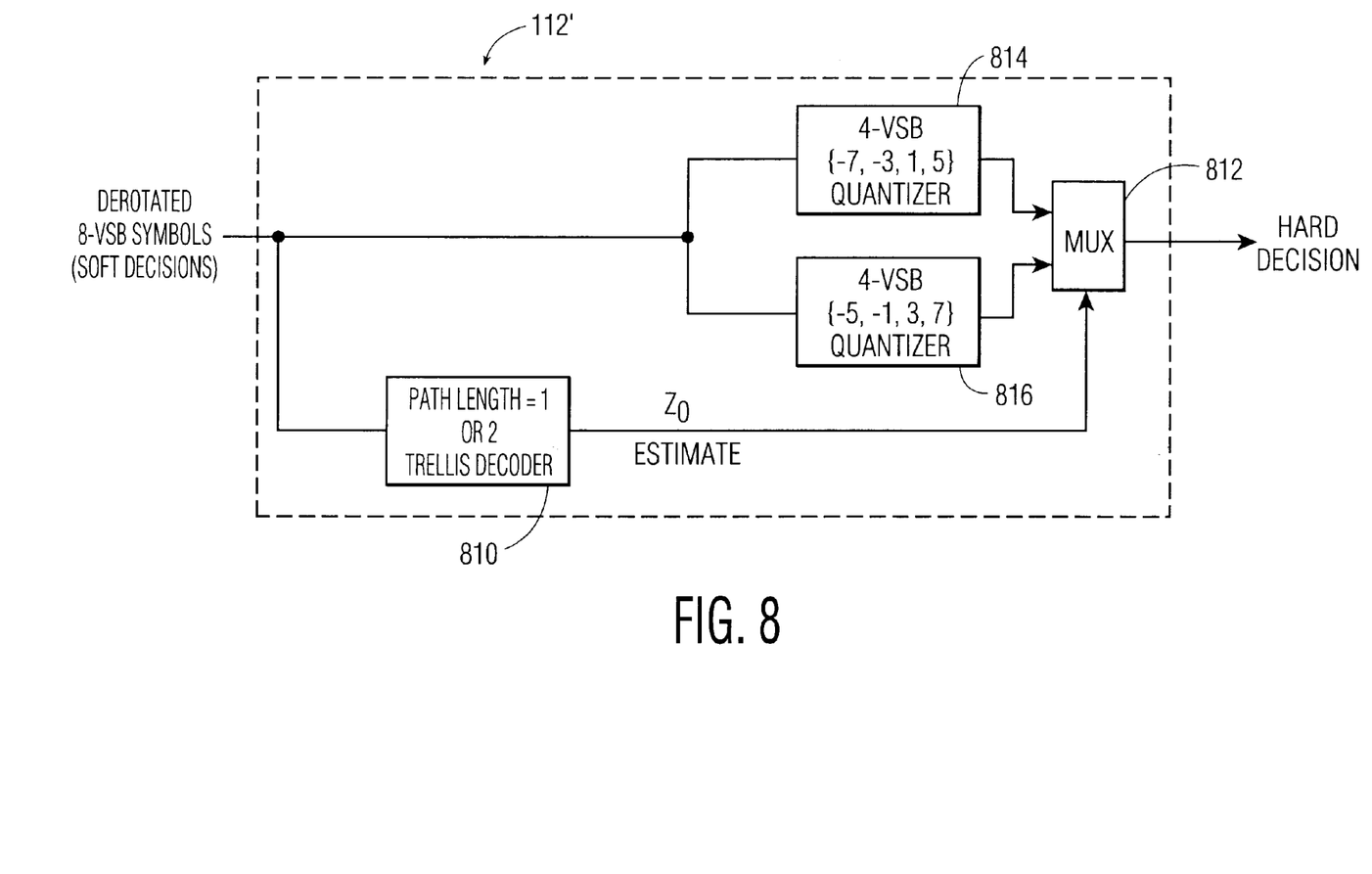
FIG. 8 is a block diagram of a first exemplary symbol slicer according to the present invention.
Figure 9:
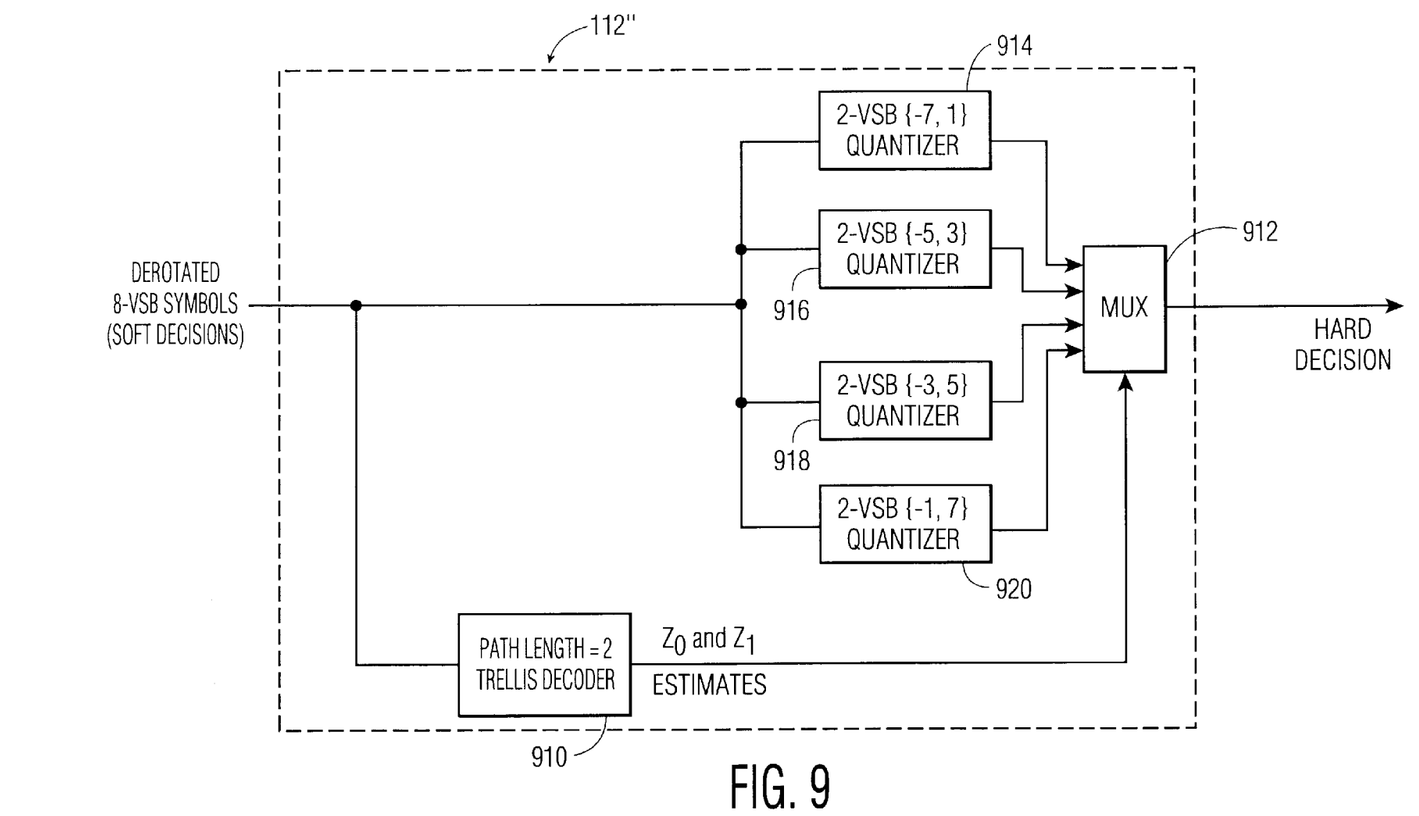
FIG. 9 is a block diagram of a second exemplary symbol slicer according to the present invention.

At the receiver, a smart slicer according to the present invention is used, which provides an estimate $Z_0(n)$. Exemplary smart slicers for VSB are shown in FIGS. 8 and 9. A first exemplary implementation estimates a single bit, $Z_0$, of the three bit symbol. FIG. 8 shows an exemplary implementation of a slicer 112' when bit $Z_0$ is known, as shown, in this implementation, the 8 VSB constellation may be decomposed into the disjoint union of two 4 VSB constellations. In this exemplary embodiment, a trellis decoder 810 may be used to estimate the one bit $Z_0$, and this value may then be used to control the multiplexer 812 to select the symbols from one of two disjoint 4 VSB quantizers 814 and 816. For example, the 8 VSB constellation can be decomposed as set forth in equation (3).

$$8VSB=\{-7,-3,1,5\} \cup \{-5,-1,3,7\} \quad (3)$$

where the first 4 VSB subset, (quantizer 814) corresponds to $Z_0=0$ and the second VSB subset (quantizer 816) corresponds to $Z_0=1$ respectively.

While a general trellis decoder 810 can be used to estimate $Z_0$, it is desirable that the estimate for $Z_0$ be available within one symbol interval. The decoder becomes more complicated if the estimate is not available within one symbol interval. First, the decision feedback cannot be done within one symbol interval. Assuming that the $Z_0$ estimate is available N trellis encoded symbols later (e.g. because the ATSC standard specifies 12 parallel trellis encoders, the decision feedback cannot be done for 12*N symbols periods). Furthermore, the computation of the error term is also delayed, consequently, the data values are stored to implement an LMS adaptive algorithm. The longer the delay, the larger the storage area to hold the data values. Hence, it is desirable to get an estimate of $Z_0$ in the same symbol interval.

In general, trellis decoders are well known in the art and use the Viterbi Algorithm as described in the above-referenced text by Viterbi et al. During every interval path metrics corresponding to every state are computed in accordance with a trellis diagram such as that shown in FIG. 7. The path metrics are defined as $p_0(n)$, $p_1(n)$, $p_2(n)$, $p_3(n)$ for the four-state trellis corresponding to states $S_1(n)$, $S_0(n)=(0,0)$, $(0,1)$, $(1,0)$, $(1,1)$ respectively. The branch metrics, bm, for the branches in the trellis are denoted as shown in equations (4)–(7).

$$bm('a')=\text{Euclidean distance (current sample, subset ('a'))} \quad (4)$$

$$bm('b')=\text{Euclidean distance (current sample, subset ('b'))} \quad (5)$$

$$bm('c')=\text{Euclidean distance (current sample, subset ('c'))} \quad (6)$$

$$bm('d')=\text{Euclidean distance (current sample, subset ('d'))} \quad (7)$$

Then the path metrics are computed every symbol interval according to the Viterbi Algorithm as shown in equations (8)–(11).

$$p_0(n)=\text{minimum}\{p_0(n-1)+bm('a'), p_2(n-1)+bm('b')\} \quad (8)$$

$$p_1(n)=\text{minimum}\{p_0(n-1)+bm('b'), p_2(n-1)+bm('a')\} \quad (9)$$

$$p_2(n)=\text{minimum}\{p_1(n-1)+bm('c'), p_3(n-1)+bm('d')\} \quad (10)$$

$$p_3(n)=\text{minimum}\{p_1(n-1)+bm('d'), p_3(n-1)+bm('c')\} \quad (11)$$

This notation is used below to describe the different methods for estimating $Z_0(n)$.

Case 1: Path Memory=2

In this case, the $Z_0(n)$ estimate is based on path metrics $p_0(n)$, $p_1(n)$, $p_2(n)$, $p_3(n)$. If the minimum path metric, p, among $\{p_0(n), p_1(n), p_2(n), p_3(n)\}$ corresponds to either states 0 or 1 (i.e. $p_0(n)$ or $p_1(n)$) then the estimate for $Z_0(n)$ equals 0, otherwise the estimate equals 1. The rationale for this selection is based on equation (2) above. This case may be described by equation (12).

$$Z_0(n) = 0 \text{ if minimum } \{p_0(n), p_1(n)\} < \text{minimum } \{p_2(n), p_3(n)\} \quad (12)$$
$$= 1 \text{ otherwise}$$

Case 2: Path Memory=1

In this case, the $Z_0(n)$ estimate is based on path metrics $p_0(n-1), p_1(n-1), p_2(n-1), p_3(n-1)$. If the minimum path metric among $\{p_0(n-1), p_1(n-1), p_2(n-1), p_3(n-1)\}$ corresponds to either states 0 or 2, then the estimate for $Z_0(n)$ equals 0, otherwise the estimate equals 1. The rationale for this selection is based on equation (1) above. This case may be described by equation (13).

$$Z_0(n) = 0 \text{ if minimum } \{p_0(n-1), p_2(n-1)\} < \text{minimum } \{p_1(n-1), p_3(n-1)\} \quad (13)$$
$$= 1 \text{ otherwise.}$$

Clearly the advantage of this case over path memory=2 case is that the computation of the estimate for $Z_0(n)$ can be made before the signal sample is available.

Case 3: Path Memory=2. (low complexity)

In this case, the estimate of $Z_0(n)$ is based on path metrics $\{p_0(n-1), p_1(n-1), p_2(n-1), p_3(n-1)\}$, and on 'extending' the two best states corresponding to the minimum two path metrics from among $\{p_0(n-1), p_1(n-1), p_2(n-1), p_3(n-1)\}$. In this case, the possible results are given by the conditional statements shown in Tables 1 and 2.

TABLE 1

If $p_0(n-1)$ and $p_2(n-1)$ are the best states then $Z_0(n)=0$
If $p_1(n-1)$ and $p_3(n-1)$ are the best states then $Z_0(n)=1$

TABLE 2

If $p_0(n-1)$ and $p_1(n-1)$ are the best states then
   if minimum $\{p_0(n-1)+bm('a'), p_0(n-1)+bm('b')\}$
      < minimum $\{p_1(n-1)+bm('c'), p_1(n-1)+bm('d')\}$ then $Z_0(n)=0$
   else $Z_0(n)=1$ It is possible to simplify the final computation in Table 2 to:
   if $p_0(n-1)+bm('ab')<p_1(n-1)+bm('cd')$ then $Z_0(n)=0$
   else $Z_0(n)=1$ Where bm('ab') is given by equation (14) and bm('cd') is given by equation (15).

$bm(\text{'}ab\text{'})$ = Euclidean distance (current sample, $Z_0 = 0$ slicer)  (14)
= Euclidean distance (current sample, $\{-7, -3, 1, 5\}$)

$bm(\text{'}cd\text{'})$ = Euclidean distance (current sample, $Z_0 = 1$ slicer)  (15)
= Euclidean distance (current sample, $\{-5, -1, 3, 7\}$)

The expression in Table 2 may be used for the rest of the pairs of path metrics $\{p_0(n-1), p_3(n-1)\}$, $\{p_2(n-1), p_1(n-1)\}$, and $\{p_2(n-1), p_3(n-1)\}$ by substituting $p_2(n-1)$ for $p_0(n-1)$ and by substituting $p_3(n-1)$ for $p_1(n-1)$ wherever appropriate.

Clearly in this case, only one comparison is implemented to determined the $Z_0(n)$ estimate and thus this case is of lower complexity than the case in which Path Memory=2. In addition, this case performs better than the case of Path Memory =1.

Given these methods of estimating $Z_0(n)$, the input sample is quantified from one of two 4 VSB subsets. The symbol error for 4 VSB at the SNR corresponding to the ATSC threshold of visibility (TOV) is well below the rule of thumb of one in ten. Hence, the smart-slicer can provide reliable symbol quantization for decision-directed operation even at the ATSC specified TOV.

So far the exemplary methods have calculated only the estimate of the bit $Z_0(n)$. It is possible, however, to estimate the bit $Z_1(n)$ as well. In this option, the bits $Z_0(n)$ and $Z_1(n)$ are estimated and the 8 VSB constellation may be decomposed into a disjoint union of four 2 VSB subsets as set forth in equation (16)

$$8 \text{ VSB} = \{-7,1\} \cup \{-5,3\} \cup \{-3,5\} \cup \{-1,7\} = \text{'}a\text{'} \cup \text{'}c\text{'} \cup \text{'}b\text{'} \cup \text{'}d\text{'} \quad (16)$$

where the four 2 VSB subsets correspond to $(Z_1, Z_0)=(0,0), (0,1), (1,0), (1,1)$ respectively. An implementation of this slicer 112" is shown in FIG. 9, where a path length=2 trellis decoder 910 generates estimates of $Z_0$ and $Z_1$ and applies these estimates as control signals to a multiplexer 912. The multiplexer 912 divides the symbols among quantizers 914, 916, 918, and 920 according to the values of $Z_0$ and $Z_1$.

The bits $Z_0$ and $Z_1$, may be estimated using the conditional statements of Table 1 shown above for Path Memory =2. Given $p_0(n), p_1(n), p_2(n), p_3(n)$, the process calculates the minimum path metric among $\{p_0(n), p_1(n), p_2(n), p_3(n)\}$, then determines whether the path that was selected for the minimum path metric corresponds to either $Z_1(n)=0$ or $Z_1(n)=1$ (i.e., either the dotted or the solid line in FIG. 7B). The $Z_0(n)$ estimate may be calculated as described above. Hence, using the method outlined above, both the $Z_0(n)$ and $Z_1(n)$ estimates are available.

For a reduced complexity version of Case 3 described above, a further determination may be made of whether the path selected for the minimum path metric corresponding to either $Z_1(n)=0$ or 1 (as described above) may be used as an estimate. of $Z_1(n)$.

While this technique has been described only for the ATSC trellis code, it is clear from the above discussion that it can be applied for any feedback trellis encoder which may be partitioned into distinct sets. In particular, although the discussion set forth above describes a three-bit trellis code, it is contemplated that the same method may be applied to trellis codes which represent digital values having four or more bits. In addition, although the exemplary embodiments of the invention generate estimates for one or two bits to decode the remaining bits, it is contemplated that more bits may be estimated using extensions of the apparatus and method described above.

Figure 10:
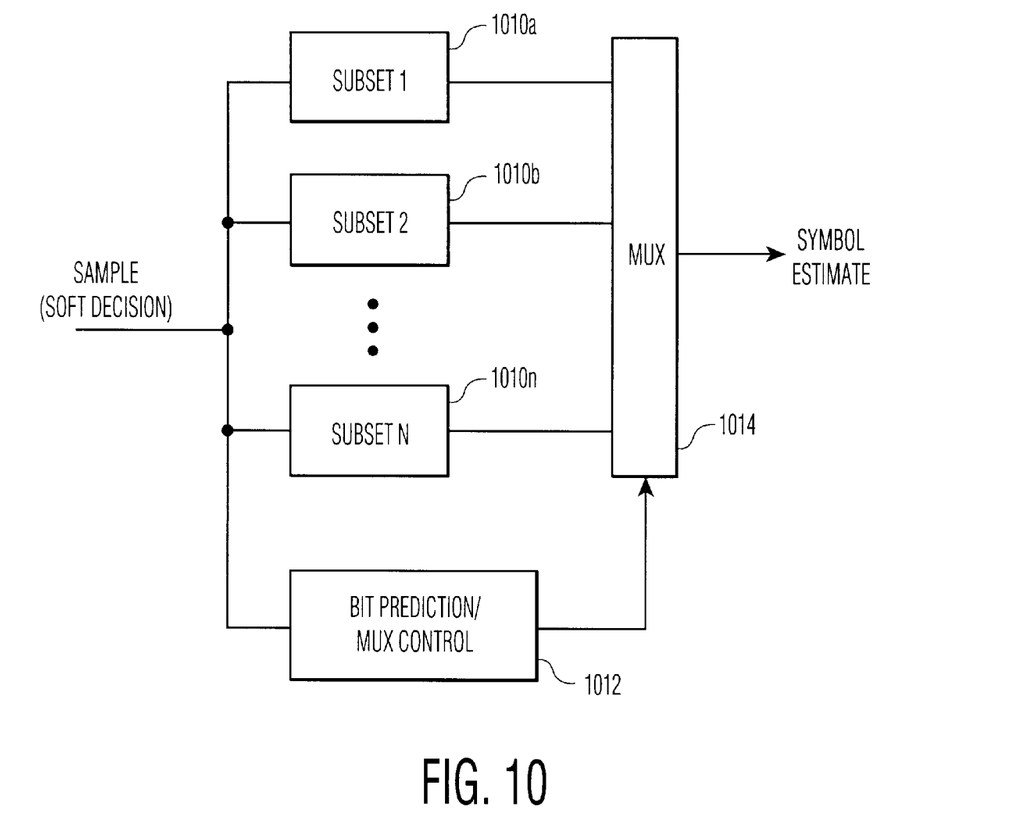
FIG. 10 is a block diagram of a third exemplary symbol slicer according to the present invention.

In general, the techniques described above may be used to implement a decoder of the type shown in FIG. 10. In this Figure, the code is divided into N subsets, each corresponding to one of the trellis decoders 1010a through 1010n. input samples are applied to the decoder so that each of the trellis decoders 1010a through 1010n acts on the input samples in parallel. At the same time, the samples are processed by a bit prediction/multiplexer control processor 1012, which, using the techniques described above, generates an estimate for a subset of the bits of the digital values that defines which one of the trellis decoders 1010a through 1010n is most likely to produce the correct result. The output signal of the processor 1012 is applied to a multiplexer 1014 which selects the output signal of the appropriate multiplexer as the symbol estimate.

In the embodiment shown in FIG. 10, the bit prediction and multiplexer control processor 1014 may implement any of the bit estimation techniques described above. For techniques having a path length of two, the processor 1014 may not provide an estimate for the first symbol in a sequence as the estimate for a given symbol utilizes information obtained from decoding the previous symbol.

While the invention has been described in terms of exemplary embodiments, it may be practiced as outlined above within the scope of the appended claims.

What is claimed:

1. A method for processing a plurality of sequentially encoded and channel impaired sample values, the sample values being encoded according to a predetermined set of code values, the method comprising the steps of:

dividing the set of code values into N subsets, each subset including a plurality of M values, where N and M are integers greater than or equal to 2;

defining a state transition matrix to be used to decode encoded values, the state transition matrix defining S states, where S is an integer greater than or equal to 2;

selecting P subsets of the S states, according to a calculated path metric, as providing an indication of a partially decoded and quantized sample value, where P is an integer greater than one; and using the partially decoded and quantized sample value to determine to which of the N subsets a next sample value is to be assigned.

2. A method according to claim 1 wherein the predetermined set of code values corresponds to a set-partitioned trellis code.

3. A method according to claim 1, wherein the predetermined set of code values corresponds to a set-partitioned trellis code which uses feedback convolution codes.

4. A method according to claim 1, wherein:
the encoded sample values are encoded according to an 8-VSB trellis code defined by the advanced television standards committee (ATSC) for digital video encoding;
S equals four;
P equals two; and
the path metric is a measure of Euclidean distance between the next sample value and each of the sample values in each of the P subsets.

5. A method according to claim 1, wherein:
the encoded sample values are encoded according to an 8-VSB trellis code defined by the advanced television standards committee (ATSC) for digital video encoding;
S equals four;
P equals S; and
the path metric is a measure of Euclidean distance between the next sample value and each of the sample values in each of the P subsets.

* * * * *